United States Patent [19]

Lewis et al.

[11] Patent Number: 4,954,549

[45] Date of Patent: Sep. 4, 1990

[54] SUBSTANTIALLY TRANSPARENT FLAME RETARDANT AROMATIC POLYCARBONATE COMPOSITIONS

[75] Inventors: Larry N. Lewis, Scotia; Stephen C. Bunnell, Ballston Lake, both of N.Y.

[73] Assignee: General Electric Company, Schenectady, N.Y.

[21] Appl. No.: 399,094

[22] Filed: Aug. 28, 1989

[51] Int. Cl.$^5$ .............................................. C08L 5/54
[52] U.S. Cl. .................................... 524/264; 524/265; 524/267
[58] Field of Search ........................ 524/264, 265, 267

[56] References Cited

U.S. PATENT DOCUMENTS

| | | | |
|---|---|---|---|
| 3,971,756 | 7/1976 | Bialous et al. | 524/264 |
| 4,138,379 | 2/1979 | Scott et al. | 524/265 |
| 4,305,856 | 12/1981 | Sakano et al. | 524/267 |
| 4,375,525 | 3/1983 | Idel et al. | 524/264 |
| 4,387,176 | 6/1983 | Frye | 524/268 |
| 4,417,018 | 11/1983 | Ogawa et al. | 524/264 |
| 4,663,374 | 5/1987 | Sonoda | 524/267 |

*Primary Examiner*—Veronica P. Hoke
*Attorney, Agent, or Firm*—William A. Teoli; James C. Davis, Jr.; William H. Pittman

[57] ABSTRACT

Flame retardant aromatic polycarbonate blends are provided which are capable of being tested V-O under UL-94 test conditions. A triarylsilicon material such as triphenylsilanol is incorporated into the aromatic polycarbonate to provide transparent, flame retardant compression moldable thermo-plastics capable of satisfying the UL-94 V-O requirement at 1/16".

5 Claims, No Drawings

SUBSTANTIALLY TRANSPARENT FLAME RETARDANT AROMATIC POLYCARBONATE COMPOSITIONS

REFERENCE TO COPENDING APPLICATIONS

Reference is made to the copending application of L. N. Lewis, Ser. No. 399,095, for "Flame Retardant Aromatic Polycarbonate Compositions" and Ser. No. 399,096, Davis et al., for "Flame Retardant Aromatic Polycarbonate Copolymer Compositions", all filed Aug. 28, 1989 and incorporated herein by reference, and the copending application of Policastro et al., Ser. No. 07/319,026, filed Mar. 6, 1989 for "Flame Retardant Aromatic Polycarbonate Blends" which also is incorporated herein by reference.

BACKGROUND OF THE INVENTION

The present invention relates to substantially transparent flame retardant halogen-free aromatic polycarbonate compositions More particularly, the present invention relates to the use of certain triarylsilanes, such as triphenylvinylsilane or triphenylsilanol to impart UL-94 V-O flame retardant properties to aromatic polycarbonates without adversely affecting their transparency.

Aromatic polycarbonate, such 2,2-bis-(4-hydroxyphenyl)-propane or bisphenol A polycarbonates have found wide use in glazing applications. However, it is widely known that BPA polycarbonate often cannot be blended with other materials without adversely affecting its transparency.

In copending application Ser. No. 07/319,026, filed Mar. 6, 1989, for flame retardant aromatic polycarbonate blends, improved flame retardant properties can be achieved with polycarbonates by incorporating into the polycarbonate certain arylenesilicon materials, such as silicone polyimides or aromatic polyester-siloxane block copolymers. Additional organosilicon materials are employed as plasticizers with polycarbonates as shown by Mark et al., U.S. Pat. No. 4,230,661, while Acquiri et al., U.S. Pat. No. 4,273,691 and Frye, U.S. Pat. No. 4,387,176 teach that certain silicone materials or silicone blends, when used in combination with alkaline earth metal salts, can impart improved flame retardant properties to various organic polymers. Experience has shown, however, that although improved flame resistance has been imparted to aromatic polycarbonates utilizing the aforementioned flame retardants, undesirable toxic by-products of combustion often are emitted which have interfered with the commercial acceptance of flame retardant polycarbonates in many instances. In addition, although in some instances flame retardants have been used in polycarbonates which have not resulted in undesirable toxic by-products during burning as taught in copending application Ser. No. 319,026, it has been difficult to achieve UL-94 V-O flame retardance if the flame retardant blend is tested at a thickness of less than ⅛", such as 1/16".

It would be desirable therefore to provide aromatic polycarbonate compositions which are transparent and which can provide UL-94 V-O flame retardancy. As used hereinafter, the term flame retardant means that the flame retardant polycarbonates have satisfied UL94 V-O requirements for flammability, as shown by the "Flammability of Plastic Materials Bulletin" of Jan. 24, 1980. More particularly, a 5"×⅛"×1/16" polycarbonate test bar containing an effective amount, as defined hereinafter, of the flame retardant, is suspended vertically over a ¾" Bunsen Burner flame as provided in the aforementioned UL94 test. The test sample preferably exhibits a UL94 V-O rating which includes the following criteria:

A. Not have any specimen which burn with flaming combustion for more than 10 seconds after application of the test flame.
B. Not have a total flaming combustion time exceeding 50 seconds for 10 flame applications for each set of five specimens.
C. Not have any specimens which burn with flaming or glowing combustion up to the holding clamp.
D. Not have any specimens which drip flaming particles that ignite dry absorbent surgical cotton located 12 inches (305 mm) below the test specimen.
E. Not have any specimens with glowing combustion which persists for more than 30 seconds after the second removal of the test flame.

SUMMARY OF THE INVENTION

The present invention is based on the discovery that UL-94 V-O flame retardant properties can be imparted to aromatic polycarbonates even when tested at 1/16" as a compression molded test sample, if there is incorporated into the aromatic polycarbonate an effective amount of a triarylsilicon material included within the formula $$(R)_3SiY \tag{1}$$

where R is a $C_{(6-13)}$ aromatic organic radical and Y is a member selected from the class consisting of vinyl, OH and $(R)_3Si$-. Surprisingly, the resulting aromatic polycarbonate blends are also substantially transparent and useful in glazing applications.

STATEMENT OF THE INVENTION

There is provided by the present invention, substantially transparent flame retardant halogen-free aromatic polycarbonate compositions comprising an aromatic polycarbonate resin, and an effective amount of a triarylsilane of formula (1).

Included within the triarylsilanes of formula (1) are, for example, triphenylvinylsilane, triphenylsilanol and hexaphenyldisilane.

Among the aromatic polycarbonates which can be rendered flame retardant in the practice of the invention, there are included aromatic polycarbonates formed by phosgenating the following bisphenols: p,p'bisphenol A, m,p-bisphenol A, o,p-bisphenol A, spirobiindane bisphenol and tetramethylbisphenol A and tetramethylbiphenol. Copolycarbonates containing the aforementioned bisphenols as a major bisphenol constituent are also included. Preferably, the polycarbonate is a bisphenol A polycarbonate having an intrinsic viscosity (IV) of from 0.35 to 1.8 dl/g in chloroform at 25° C.

Additional polycarbonates and methods for making which are incorporated herein by reference, can be found in Schnell, et al., U.S. Pat. No. 3,028,365; Idel, et al., U.S. Pat. No. 4,185,009; Evans, et al., U.S. Pat. No. 4,605,731; Evans, et al., U.S. Pat. No. 4,701,519; and Brunelle, et al., U.S. Pat. No. 4,727,134. In addition Kirk-Othmer, 3rd Edition, Vol. 18, pages 479–494, shows additional procedures.

In the practice of the present invention, blending of the triarylsilicon material and the polycarbonate can be facilitated by mixing the polycarbonate and the triarylsilicon material in finally divided form, in the presence of a suitable inert organic solvent to disperse the triarylsilicon material into the polycarbonate powder. Effective results can be achieved with the use of hindered aliphatic alcohols, such as isobutanol, and isopropanol or an appropriate volatile inert organic solvent in which the polycarbonate is substantially insoluble and into which the triarylsilicon material is soluble. After the triarylsilicon material has been dispersed into the polycarbonate powder, the mixture can be allowed to stand under atmospheric conditions for several hours, and preferably in a hood, to allow the solvent to evaporate. The mixture can then be placed in a vacuum oven for 2 to 20 hours at 90° to 130° C. under reduced pressure to facilitate the removal of any excess organic solvent. The resulting powdered mixture can then be compression molded in a Carver press at from 180° to 220° C. at 300 psi to 7000 psi for 2 to 5 minutes. Suitable test bars can then be cut from the compression molded sheet if desired.

An effective amount of triarylsilicon material is from 3 to 10% by weight of triarylsilicon material and preferably 5 to 6% based on the weight of blend.

The flame retardant polycarbonate compositions of the present invention also can be reinforced with inert fillers such as silica filler, carbon fibers or glass fibers. The proportion of filler which can be utilized can vary from 1 to 100 parts of filler per 100 parts of the aromatic polycarbonate composition by weight.

The flame retardant aromatic polycarbonate compositions of the present invention can be used in glazing applications and various structures including 1/16" business machine housings requiring the properties of high performance compression moldable thermoplastic materials.

In order that those skilled in the art be better able to practice the present invention, the following examples are given by way of illustration and not be way of limitation. All parts are by weight.

EXAMPLE 1

A mixture of Lexan 140 polycarbonate powder and having 6% by weight of the triphenylsilanol was prepared. The triphenylsilanol was mixed with isobutanol, followed by blending the slurry with the aromatic polycarbonate. There was used one ml. of isobutanol per gram of the aromatic polycarbonate. The resulting mixture was then allowed to rest under atmospheric conditions for a period of about 12 hours followed by devolatilizing the blend at a temperature of 100° C. at 30 torr for 17 hours. The resulting mixture was then compression molded at 200° C. at 5000 psi for 3 minutes to give 1/16" sheets which were then cut into ½" wide bars. A UL-94 test indicated that the resulting compression molded bars had an average flame-out time (FOT) in the first burn of 1.1 second. On the second burn, it was noted that the FOT was also about 1 second. However there were meltdowns (MD) and flaming jets (FJ). Based on these results a V-O rating was obtained.

In accordance with the procedure of Example 1, 1.8 grams of triphenylvinylsilane was combined with 30 ml. of isobutanol and mixed with Lexan 140 polycarbonate resin powder. The mixture was allowed to stand for 17 hours in a hood and then was placed in a vacuum oven for 17 hours at 100° C. at 30 torr. The granulated mixture was then compression molded into 1/16" thick sheets in a Carver press at 200° C. and 5000 psi for 3 minutes. There was obtained a transparent 1/16" thick sheet which was cut into ½" wide bars tested in the UL-94 burn test. It was found that the resulting transparent polycarbonate test slabs tested V-O. In addition, unlike Example 1, there was no indication of meltdowns or flaming jets on the second burn.

EXAMPLE 3

The procedure of Example 1 was repeated except that in place of the triphenylvinylsilane there was used 1.8 grams of hexaphenyldisilane, 30 ml. of isobutanol and 30 grams of polycarbonate. There was obtained a transparent 1/16" thermoplastic sheet which was cut into ½" wide bars. The resulting polycarbonate test samples were found to provide a V-O rating when tested under the UL-94 conditions.

In addition to the above-described triphenylsilicon materials, additional phenyl-substituted silicon materials such as tetraphenyldimethyl disiloxane, tetramethyl, tetraphenyl-cyclotetrasiloxane, hexaphenyldisiloxane and tetraphenylsilane were evaluated as flame retardants for aromatic polycarbonates following the same procedure. It was found that all of these materials failed in the UL-94 test due to flaming drips (FD) on second burns.

Additional phenylsilanes were evaluated such as dimethylphenylvinylsilane and diphenylmethylvinylsilane were evaluated following the procedure of Example 1 and it was found that these phenylvinylsilanes also provided flame retardant aromatic polycarbonate blends having a V-O rating using the UL-94 flame retardancy test. However, it was also found that these flame retardant polycarbonates were not substantially transparent and could not be used as glazing materials.

Although the above examples are directed to only a few of the very many variables which can be used in the making of the flame retardant aromatic polycarbonates of the present invention, it should be understood that the present invention is directed to a much broader variety of flame retardant aromatic polycarbonates as a result of the use of different aromatic polycarbonates and diarylsilicon materials as shown in the description preceding these examples

What is claimed is:

1. A substantially transparent flame retardant halogen-free aromatic polycarbonate comprising an aromatic polycarbonate resin, and an effective amount of a triarylsilane of the formula $$(R)_3SiY \qquad (1)$$

where R is a $C_{(6-13)}$ aromatic organic radical and Y is a member selected from the class consisting of vinyl, OH and $(R)_3Si-$.

2. A flame retardant halogen-free aromatic polycarbonate resin in accordance with claim 1 where the aromatic polycarbonate resin is a bisphenol A polycarbonate.

3. A substantially transparent flame retardant halogen-free aromatic polycarbonate in accordance with claim 1 where the triarylsilane is triphenylvinylsilane.

4. A substantially transparent flame retardant halogen-free aromatic polycarbonate in accordance with claim 1 where the triarylsilane is triphenylsilanol.

5. A substantially transparent flame retardant halogen-free aromatic polycarbonate in accordance with claim 1 where the triarylsilane is hexaphenyldisilane.

* * * * *